(12) United States Patent
Moro

(10) Patent No.: US 9,365,301 B2
(45) Date of Patent: Jun. 14, 2016

(54) METHOD OF COMMAND OF MAGNETO-TORQUERS OF AN ATTITUDE CONTROL SYSTEM OF A SPACE VEHICLE

(71) Applicant: AIRBUS DEFENCE AND SPACE SAS, Les Mureaux (FR)

(72) Inventor: Valerio Moro, Toulouse (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 0 days.

(21) Appl. No.: 14/404,588

(22) PCT Filed: Oct. 25, 2013

(86) PCT No.: PCT/EP2013/072345
§ 371 (c)(1),
(2) Date: Nov. 28, 2014

(87) PCT Pub. No.: WO2014/067856
PCT Pub. Date: May 8, 2014

(65) Prior Publication Data
US 2015/0225092 A1    Aug. 13, 2015

(30) Foreign Application Priority Data
Oct. 30, 2012    (FR) .................................... 12 02923

(51) Int. Cl.
*B64G 1/36* (2006.01)
*B64G 1/32* (2006.01)
*G05D 1/08* (2006.01)
*G01L 3/10* (2006.01)
*G01L 5/00* (2006.01)
*G01L 5/22* (2006.01)
*B64G 1/24* (2006.01)

(52) U.S. Cl.
CPC ........ *B64G 1/32* (2013.01); *B64G 1/366* (2013.01); *G01L 3/101* (2013.01); *G01L 5/0042* (2013.01); *G01L 5/22* (2013.01); *G05D 1/0883* (2013.01); *B64G 2001/245* (2013.01)

(58) Field of Classification Search
CPC ............... B64G 1/10; B64G 1/24; B64G 1/32
See application file for complete search history.

(56) References Cited

U.S. PATENT DOCUMENTS
7,376,496 B1    5/2008    Weigl et al.

FOREIGN PATENT DOCUMENTS
EP    1308813 A1    5/2003
EP    1357451 A1    10/2003

*Primary Examiner* — Michael D Lang
(74) *Attorney, Agent, or Firm* — IM IP Law PLLC; C. Andrew Im

(57) ABSTRACT

A method of command of magneto-torquers of an attitude control system of a space vehicle subjected to an external magnetic field of variable direction. The magneto-torquers are configured to desaturate an angular momentum storage device by transferring angular momentum and configured to form, in cooperation with the local external magnetic field, magnetic couples in a plane orthogonal to the direction of the local external magnetic field or a local control plane. The magnetic couple to be formed in the local control plane is determined as a function of the component of a desired attitude control couple which is orthogonal to the local control plane or a locally uncontrollable component. The contribution of the locally uncontrollable component to the magnetic couple to be formed is non-zero when the locally uncontrollable component is non-zero.

10 Claims, 4 Drawing Sheets

METHOD OF COMMAND OF MAGNETO-TORQUERS OF AN ATTITUDE CONTROL SYSTEM OF A SPACE VEHICLE

RELATED APPLICATIONS

This application is a §371 application from PCT/EP2013/072345 filed Oct. 25, 2013, which claims priority from French Patent Application No. 12 02923 filed Oct. 30, 2012, each which is incorporated herein by reference in its entirety.

TECHNICAL FIELD

The present invention belongs to the field of the attitude control of space vehicles, such as satellites in orbit around the Earth. More particularly, the present invention relates to a method of command of magneto-torquers implemented so as to desaturate an angular momentum storage device of an attitude control system.

PRIOR ART

An attitude control system of a satellite in orbit around the Earth generally comprises an angular momentum storage device so as to absorb the effects of external disturbing torques acting on said satellite (like those induced by residual atmospheric drag, by solar radiation pressure, etc.).

In a conventional manner, such an angular momentum storage device comprises inertial actuators (gyroscopes, reaction wheels, etc.) implemented so as to create attitude control torques whose effects compensate the effects of the external disturbing torques.

Because the effects of the external disturbing torques accumulate over time, the angular momentum of the storage device increases progressively over time, until it may possibly saturate the storage device, that is to say until the maximum capacity of said storage device is attained.

In order to avoid any saturation of the storage device, torques are applied in a recurrent manner to the satellite so as to desaturate the storage device by transfer of angular momentum.

To desaturate the angular momentum storage device, it is for example known to use magneto-torquers.

Magneto-torquers are actuators which make it possible to create magnetic torques in cooperation with an external magnetic field. Such magneto-torquers are generally implemented in the attitude control systems of satellites in low orbit around the Earth, the terrestrial magnetic field then being used by the magneto-torquers to form the magnetic torques.

However, at a given instant and whatever the configuration of the magneto-torquers, it is not physically possible to form magnetic torques in the direction of the local external magnetic field.

Stated otherwise, at a given instant, the magneto-torquers can only desaturate the storage device in relation to at most two axes, in a plane orthogonal to the local external magnetic field, referred to as the "local control plane". However, desaturation of the storage device in relation to the third axis will be able to be performed subsequently if the direction of the external magnetic field varies over time with respect to the storage device, the orientation of the local control plane of the magneto-torquers also varying over time with respect to said storage device.

SUMMARY OF THE INVENTION

The objective of the present invention is to propose a solution which makes it possible more generally to improve the performance of the attitude control of a space vehicle by means of magneto-torquers, and which makes it possible in particular to improve the performance of the desaturation of the angular momentum storage system.

Furthermore, the objective of the present invention is to propose a solution which is simple and inexpensive to implement, applicable even in attitude control systems of space vehicles which are already on station in orbit around the Earth.

For this purpose, and according to a first aspect, the invention relates to a method of command of magneto-torquers of an attitude control system of a space vehicle subjected to an external magnetic field of variable direction, said magneto-torquers being implemented so as to control the attitude of said space vehicle and being suitable for forming, in cooperation with the local external magnetic field, magnetic torques in a plane orthogonal to the direction of said local external magnetic field, referred to as the "local control plane". The method comprises in particular steps of:
  measuring the local external magnetic field,
    determining a magnetic torque to be formed in the local control plane as a function of a desired three-axes attitude control torque,
    commanding the magneto-torquers in such a way as to form, in cooperation with the local external magnetic field, the determined magnetic torque.

Furthermore, the method of command is characterized in that the magnetic torque to be formed in the local control plane is determined as a function of the component of the desired attitude control torque which is orthogonal to the local control plane, referred to as the "locally uncontrollable component", the contribution of said locally uncontrollable component to the magnetic torque to be formed being non-zero when said locally uncontrollable component is non-zero.

Throughout the present patent application, "local" is understood to mean "at the level of the space vehicle at the instant considered".

It should furthermore be noted that "desired attitude control torque" is understood to mean also, in particular for sampled attitude control systems, a desired variation of angular momentum $\Delta H$ during a time interval $\Delta T$, the desired attitude control torque being in this case equal to $\Delta H/\Delta T$.

The locally uncontrollable component of the desired attitude control torque corresponds to the component which is in the direction of the local external magnetic field and on which the magneto-torquers cannot act. It should be noted that, because the magneto-torquers cannot act on said locally uncontrollable component, the latter is, in all known magneto-torquer command methods, systematically ignored when determining the magnetic torque to be formed in the local control plane. Stated otherwise, in the prior art, the action performed by the magneto-torquers at a given instant takes into account only that component of the desired attitude control torque which is situated in the local control plane.

Contrary to what is performed in the methods of command of the prior art, the locally uncontrollable component of the desired attitude control torque is, according to the invention, taken into account to determine the magnetic torque to be formed in the local control plane.

Indeed, it has been observed that, although locally inoperative and contrary to the prejudices of the person skilled in the art, by taking account of the locally uncontrollable component it has been possible to improve the performance of the attitude control in relation to three axes over time, in particular the performance of the desaturation in relation to three axes when said magneto-torquers are implemented so as to desaturate an angular momentum storage device.

To implement a method of command according to the invention, a software modification of the methods of command of the prior art will generally be sufficient. Thus, a method of command according to the invention will be able to be implemented even in satellites already on station and equipped with remote software updating means.

In particular modes of implementation, the method of command can furthermore comprise one or more of the following characteristics, taken in isolation or according to all technically possible combinations.

In a particular mode of implementation, the contribution of the locally uncontrollable component of the desired attitude control torque to the magnetic torque to be formed in the local control plane is furthermore determined as a function of a model of temporal variation of the direction of the external magnetic field.

Such provisions are advantageous in that by taking into account a model of temporal variation of the direction of the external magnetic field with respect to the space vehicle it is made possible to increase and to control the control bandwidth, so that it is possible to have more reactive attitude control in relation to three axes than with the methods of command of the prior art. For example, in the case of a desaturation of an angular momentum storage device, the excursion, related to the external disturbing torques, in angular momentum of the storage device will be able to be decreased, and it will be possible to consider storage devices of lower maximum capacity than that required for the storage devices of the prior art.

In a particular mode of implementation, the space vehicle progressing in an orbital plane, the determination of the magnetic torque to be formed comprises the expression of the desired variation of angular momentum in a magnetic reference frame centered on the space vehicle and defined by three axes X, Y, Z: an axis X parallel to the direction of the local external magnetic field, an axis Y orthogonal to the axis X and situated in a plane orthogonal to the orbital plane, and an axis Z orthogonal to the axes X and Y.

Such provisions are advantageous in that, in the magnetic reference frame, the control law, in accordance with which the magnetic torque to be formed is determined, will be able to be expressed in a particularly simple manner.

In a particular mode of implementation, the magnetic torque to be formed is determined, in the magnetic reference frame, according to a control law expressed in the form:

$$Tmag = -\begin{bmatrix} 0 & 0 & 0 \\ 0 & Ky & 0 \\ Kzx & 0 & Kz \end{bmatrix} \cdot \frac{Tcmd}{Kn}$$

in which expression:
  Tmag corresponds to the magnetic torque to be formed,
  Tcmd corresponds to the desired attitude control torque,
  Kn is a non-zero scalar parameter dimensionally equivalent to a frequency,
  Kzx, Ky and Kz are non-zero scalar parameters or non-zero transfer functions dimensionally equivalent to frequencies.

In a particular mode of implementation, the space vehicle being in polar orbit around the Earth, the scalar parameter Kzx is expressed in the form:

$$Kzx = 2 \cdot \omega_0 \cdot \left( \left( \frac{\omega_{CL}}{2 \cdot \omega_0} \right)^2 - 1 \right)$$

in which expression:
  $\omega_0$ corresponds to the orbital frequency of the space vehicle,
  $\omega_{CL}$ corresponds to the desired desaturation bandwidth.

In a particular mode of implementation, the attitude control system comprising an angular momentum storage device, the magneto-torquers are implemented so as to desaturate said storage device by transfer of angular momentum.

In a particular mode of implementation, the desired attitude control torque is expressed in the form:

$$Tcmd = Kn \cdot \Delta H$$

in which expression:
  Tcmd corresponds to the desired attitude control torque,
  Kn is a non-zero scalar parameter dimensionally equivalent to a frequency,
  $\Delta H$ corresponds to a desired variation of the angular momentum of the storage device.

According to a second aspect, the invention relates to a computer program product comprising a set of program code instructions which, when they are executed by a processor, implement a method of command of magneto-torquers according to the invention.

According to a third aspect, the invention relates to an attitude control system of a space vehicle intended to be subjected to an external magnetic field of variable direction, said attitude control system comprising a device for measuring the local external magnetic field, an angular momentum storage device and magneto-torquers. Furthermore, the attitude control system comprises means configured to command the magneto-torquers in accordance with a method of command according to the invention.

In particular embodiments, the attitude control system can furthermore comprise one or more of the following characteristics, taken in isolation or according to all technically possible combinations.

In a particular embodiment, the measurement device is suitable for measuring the local external magnetic field in relation to three axes.

In a particular embodiment, the magneto-torquers are suitable for forming magnetic moments in relation to three axes.

PRESENTATION OF THE FIGURES

The invention will be better understood on reading the following description, given by way of wholly non-limiting example, and while referring to the figures which represent:

FIG. 1: a schematic representation of an exemplary embodiment of an attitude control system of a satellite, FIG. 2: a chart illustrating the main steps of a method of command of magneto-torquers, FIG. 3: a schematic representation of the local terrestrial magnetic field to which a satellite in polar orbit is subjected, for various positions of said satellite in its polar orbit, FIGS. 4a to 4c: simulation results illustrating the performance improvement obtained with the invention.

In these figures, references which are identical from one figure to another designate identical or analogous elements. For the sake of clarity, the elements represented are not to scale, unless stated otherwise.

DETAILED DESCRIPTION OF EMBODIMENTS

FIG. 1 represents a particular embodiment of an attitude control system of a space vehicle, such as a satellite 10, intended to be subjected to an external magnetic field of variable direction.

In the subsequent description, the case is considered of a satellite 10 intended to be placed in low orbit around the Earth 40, the external magnetic field then corresponding to the terrestrial magnetic field.

In the example illustrated by FIG. 1, the attitude control system comprises:
- an angular momentum storage device 20,
- a device 22 for measuring the local terrestrial magnetic field,
- magneto-torquers 24,
- a command unit 26.

In practice, the attitude control system can also comprise other elements, which are outside the scope of the invention and which are not represented in the figures.

In the example illustrated by FIG. 1, the storage device 20 is suitable for storing angular momenta in relation to three axes. Said storage device comprises for this purpose three reaction wheels with axes with linearly independent respective unit vectors.

The measurement device 22 is preferably suitable for measuring the local terrestrial magnetic field in relation to three axes, and makes it possible to determine both the direction and the norm of the local terrestrial magnetic field. The measurement device 22 can be of any type known to the person skilled in the art.

In the example illustrated by FIG. 1, the magneto-torquers 24 are suitable for forming magnetic moments in relation to three axes. For this purpose, the attitude control system comprises three magneto-torquers 24 with axes with linearly independent respective unit vectors.

The total magnetic moment M created by the magneto-torquers 24 makes it possible to form, in cooperation with the local terrestrial magnetic field B, a magnetic torque M ∧ B, in which expression the operator "∧" corresponds to the cross product. It is therefore understood that, at a given instant, the magneto-torquers 24 can only create magnetic torques in a plane, referred to as the "local control plane", which is orthogonal to the direction of the local terrestrial magnetic field B.

The magneto-torquers 24 are implemented so as to desaturate the storage device 20 by transfer of angular momentum. As indicated previously, the magneto-torquers 24 can, at a given instant, desaturate the storage device 20 only in relation to two axes. However, if the direction of the terrestrial magnetic field varies over time with respect to the storage device 20, desaturation of the storage device 20 in relation to the third axis will be able to be carried out subsequently.

The command unit 26 controls the attitude of the satellite 10, and drives for this purpose, in particular, the storage device 20, the measurement device 22 and the magneto-torquers 24.

In particular, the command unit 26 comprises means configured to command the magneto-torquers 24 in accordance with a method 50 of command an example of which is described in detail hereinafter. These means take for example the form of a processor and of an electronic memory in which a computer program product is stored, in the form of a set of program code instructions which, when they are executed by the processor, implement all or some of the steps of the method 50 of command of the magneto-torquers 24. In a variant, the command unit 26 comprises programmable logic circuits, of FPGA, PLD type, etc., and/or specialized integrated circuits (ASIC), suitable for implementing all or some of the steps of said method 50 of command of the magneto-torquers 24.

FIG. 2 represents the main steps of a method 50 of command of the magneto-torquers 24 to form magnetic torques for desaturating the storage device 20, which are:
- 52 measuring the local terrestrial magnetic field B by way of the measurement device 22,
- 54 determining a magnetic torque to be formed in the local control plane of the magneto-torquers 24 as a function of a desired variation of angular momentum for the storage device 20,
- 56 commanding the magneto-torquers 24 in such a way as to form, in cooperation with the local terrestrial magnetic field B, the determined magnetic torque.

Said main steps, illustrated by FIG. 2, of the method 50 of command are iterated over time, so as in particular to take account of the variations of the terrestrial magnetic field which are induced for example by the displacement of the satellite 10 in orbit around the Earth 40. Thus, by iterating said steps over time, desaturation in relation to three axes of the storage device 20 can be performed.

According to the invention, the magnetic torque to be formed in the local control plane is determined as a function of the component of the desired variation of angular momentum which is orthogonal to the local control plane, referred to as the "locally uncontrollable component", the contribution of said locally uncontrollable component to the magnetic torque to be formed being non-zero when said locally uncontrollable component is non-zero.

Thus, the magnetic torque formed in the local control plane depends on the locally uncontrollable component of the desired variation of angular momentum, even though it is not possible to act thereon at the instant considered.

In order to illustrate the improvement in the performance of the desaturation that can be obtained by taking account of the locally uncontrollable component in the magnetic torque formed, a preferred mode of implementation of method 50 of command is now described. In this preferred mode of implementation, the contribution of the locally uncontrollable component is furthermore determined as a function of a model of variation of the direction of the terrestrial magnetic field.

In order to simplify the expression for the control law in accordance with which the magnetic torque to be formed is determined as a function of the desired variation of angular momentum, a reference frame in which the direction of the terrestrial magnetic field is invariant over time, referred to as the "magnetic reference frame" Rmag, is advantageously considered.

Generally, the magnetic reference frame Rmag is centered on the satellite 10, and is defined by three axes X, Y, Z, one of which is parallel to the direction of the local terrestrial magnetic field B. For example, the axis X is parallel to said direction of the local terrestrial magnetic field B, the axis Y is orthogonal to the axis X and is situated in a plane orthogonal to the orbital plane of the satellite 10, and the axis Z is orthogonal to the axes X and Y.

In the subsequent description, the nonlimiting case is furthermore considered of a satellite 10 in polar orbit 30, and the case where the unit vectors of the axes X, Y and Z of the magnetic reference frame Rmag, designated respectively by x, y and z are defined as follows:
- x=b, in which expression b represents the local terrestrial magnetic field B after normalization,
- z=x ∧ (−$n_{ORB}$), in which expression $n_{ORB}$ represents the orbital normal, that is to say the vector orthogonal to the orbital plane and such that the direction of rotation of the satellite 10 in the orbital plane oriented by said orbital normal $n_{ORB}$ is positive, y=z∧x.

FIG. 3 schematically represents the polar orbit 30 of the satellite 10 around the Earth 40, as well as the local terrestrial magnetic field B at different instants t1, t2, t3 and t4 of said polar orbit 30. The instants t1 and t3 correspond to the passings of the satellite 10 through the equatorial plane of the Earth 40, while the instants t2 and t4 correspond to the overflight of the poles, respectively North and South, of the Earth 40. FIG. 3 also represents the magnetic reference frame Rmag at said instants t1 to t4.

As illustrated by FIG. 3, the direction of the terrestrial magnetic field rotates in the orbital plane twice as quickly as the satellite 10 around the Earth 40, in the positive direction defined by the orbital normal $n_{ORB}$.

Thus, if $\omega_0$ designates the orbital frequency of the satellite 10, that is to say the rate of rotation of the satellite 10 around the Earth 40, then the rate of rotation of the direction of the terrestrial magnetic field in an inertial reference frame is on average equal to $2\omega_0$. This rotation being performed in the positive sense around the orbital normal $n_{ORB}$, an exemplary model of variation of the direction of the terrestrial magnetic field, considered hereinafter, can consequently be expressed in the form of a vector $\Omega_{M/I}$ equal to:

$$\Omega_{M/I} = 2\omega_0 \cdot n_{ORB}$$

In a known manner, we have in an inertial reference frame the variation of the total angular momentum which is equal to the sum of the external torques. In the present case, this can be expressed in the following form:

$$\dot{H} = T\text{mag} + T\text{dist} \quad (e1)$$

in which expression:

$\dot{H}$ corresponds to the time derivative of the total angular momentum H,

Tmag corresponds to the magnetic torque formed,

Tdist corresponds to the external disturbing torque.

By taking account of the rate of rotation of the magnetic reference frame Rmag in the inertial reference frame, the expression (e1) becomes in the magnetic reference frame Rmag:

$$\dot{H} = -\Omega_{M/I} \wedge H + T\text{mag} + T\text{dist} \quad (e2)$$

The expression (e2) can also be expressed in the form:

$$\begin{bmatrix} \dot{H}x \\ \dot{H}y \\ \dot{H}z \end{bmatrix} = \begin{bmatrix} 2\omega_0 \cdot Hz \\ 0 \\ -2\omega_0 \cdot Hx \end{bmatrix} + T\text{mag} + T\text{dist} \quad (e3)$$

in which expression Hx, Hy, Hz are the components of the total angular momentum H in the magnetic reference frame Rmag.

The magnetic torque Tmag to be formed is for example calculated according to the following control law:

$$T\text{mag} = -K \cdot \Delta H \quad (e4)$$

in which expression:

K is a control matrix, $\Delta H$ is the desired variation of angular momentum, with components $\Delta Hx$, $\Delta Hy$ and $\Delta Hz$ in the magnetic reference frame Rmag.

In a preferred mode of implementation, the control matrix K takes the following form:

$$K = \begin{bmatrix} 0 & 0 & 0 \\ 0 & Ky & 0 \\ Kzx & 0 & Kz \end{bmatrix}$$

in which expression Kzx, Ky and Kz are non-zero scalar parameters dimensionally equivalent to frequencies.

The coefficients of the first row of the control matrix K are all zero, because it is not possible to form a magnetic torque in relation to the axis X of the magnetic reference frame Rmag, which corresponds to the direction of the local terrestrial magnetic field B. The parameter Kzx determines the contribution of the locally uncontrollable component $\Delta Hx$ of the desired variation $\Delta H$ of angular momentum to the magnetic torque Tmag to be formed.

In the subsequent description, the nonlimiting case is considered where the desired variation $\Delta H$ of angular momentum is equal to the total angular momentum H, so that the components $\Delta Hx$, $\Delta Hy$ and $\Delta Hz$ are equal respectively to the components Hx, Hy and Hz.

Consequently, the expression (e3) can also be expressed in the form:

$$\begin{cases} \dot{H}x = 2\omega_0 \cdot Hz + Tx \\ \dot{H}y = -Ky \cdot Hy + Ty \\ \dot{H}z = -(2\omega_0 + Kzx) \cdot Hx - Kz \cdot Hz + Tz \end{cases} \quad (e5)$$

in which expression Tx, Ty, Tz are the components of the external disturbing torque Tdist in the magnetic reference frame Rmag It should be noted that, in the magnetic reference frame Rmag considered, the axis Y does not vary over time, this being confirmed by the expression for the variation, related to the rate of rotation of the magnetic reference frame Rmag in the inertial reference frame, of the total angular momentum, namely $\Omega_{M/I} \wedge H$.

On the other hand, it is observed that the variations in relation to the axis X and the axis Z are coupled. By differentiating the expression for the component $\dot{H}z$ and by replacing the component $\dot{H}x$ by its expression, we obtain:

$$\ddot{H}z + Kz \cdot \dot{H}z + 2\omega_0 \cdot (2\omega_0 + Kzx) \cdot Hz = 0 \quad (e6)$$

By way of comparison, the control laws according to the prior art amount to considering, when expressed in the magnetic reference frame Rmag, a control matrix Kpa of the type:

$$Kpa = \begin{bmatrix} 0 & 0 & 0 \\ 0 & Kaa & 0 \\ 0 & 0 & Kaa \end{bmatrix}$$

in which expression Kaa is a non-zero scalar parameter. In this way, the expression (e6) becomes for the control laws according to the prior art:

$$\ddot{H}z + Kaa \cdot \dot{H}z + (2\omega_0)^2 \cdot Hz = 0 \quad (e7)$$

It is consequently apparent that the role of the parameter Kaa is to provide a damping to a second-order linear oscillator of frequency $2\omega_0$. Thus, it is not possible according to the prior art to control the frequency of said second-order linear oscillator, so that the maximum desaturation bandwidth is $2\omega_0$.

On the contrary, it is observed on the basis of the expression (e6) that it is possible to control the desaturation bandwidth by virtue of the parameter Kzx. For example, to obtain a desaturation bandwidth $\omega_{CL}$ and a damping $\zeta$, the parameters Kz and Kzx may be:

$$Kz = 2 \cdot \zeta \cdot \omega_{CL} \quad (e8)$$

$$Kzx = 2\omega_0 \cdot \left(\left(\frac{\omega_{CL}}{2\omega_0}\right)^2 - 1\right) \quad (e9)$$

Thus, according to the invention, it is possible to increase with respect to the prior art the desaturation bandwidth, and to control said desaturation bandwidth by taking account of the model of variation of the direction of the terrestrial magnetic field (rate of rotation $2\omega_0$ of the direction of the terrestrial magnetic field).

FIGS. 4a to 4c represent simulation results illustrating the performance improvement obtained with the invention.

More particularly, in these figures, the total angular momentum Hinv of the storage device 20 obtained in the case of a desaturation with the invention (control matrix K hereinabove) is compared with the total angular momentum Hpa obtained in the case of a desaturation according to the prior art (control matrix Kpa hereinabove).

It is observed that the invention makes it possible to obtain, in a span of altitudes lying between 500 kilometers and 800 kilometers, a reduction of greater than 70% in the total angular momentum of the storage device 20.

Figure 1:
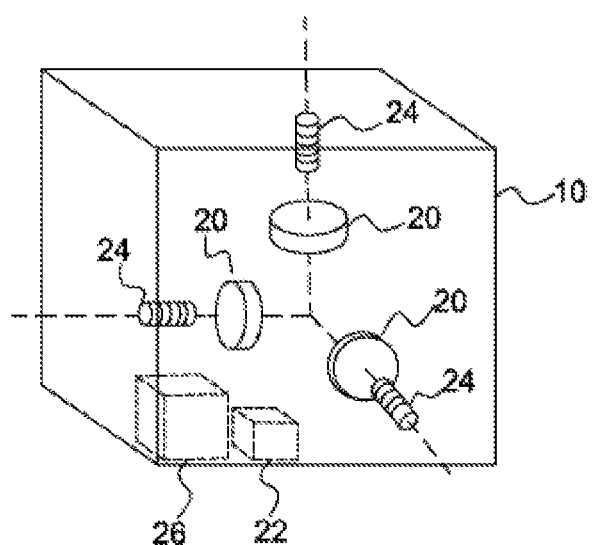
Figure 2:
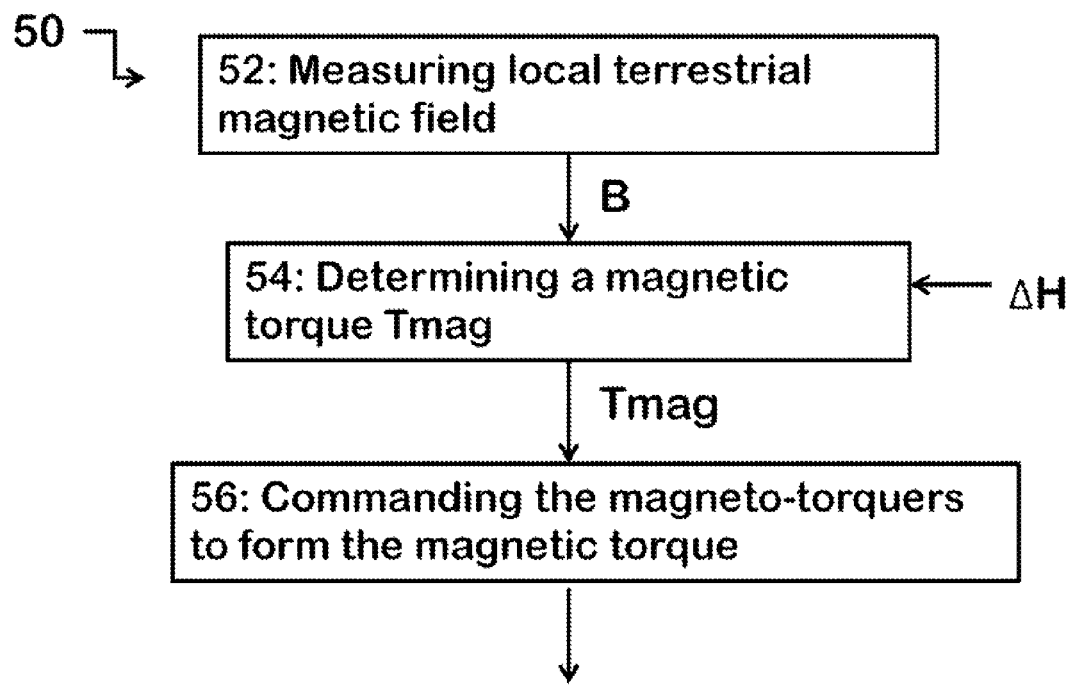
Figure 3:
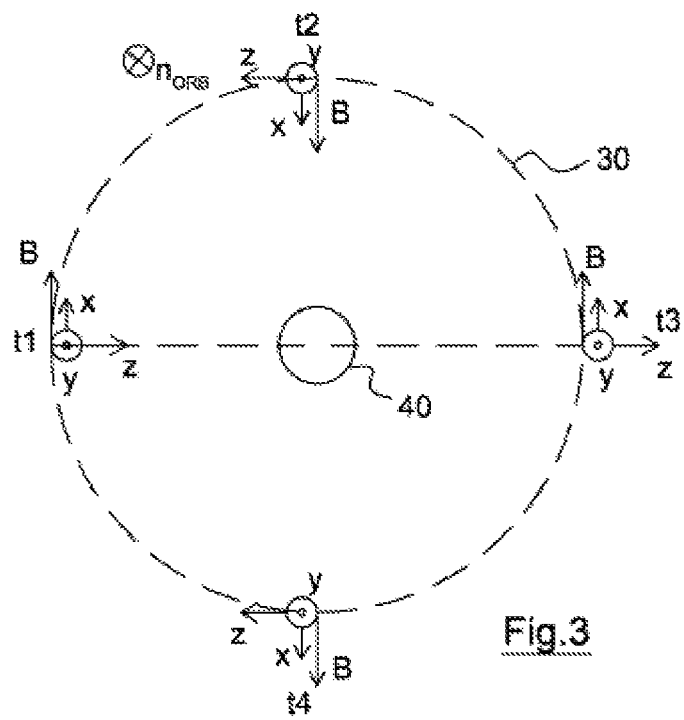
Figure 4A:
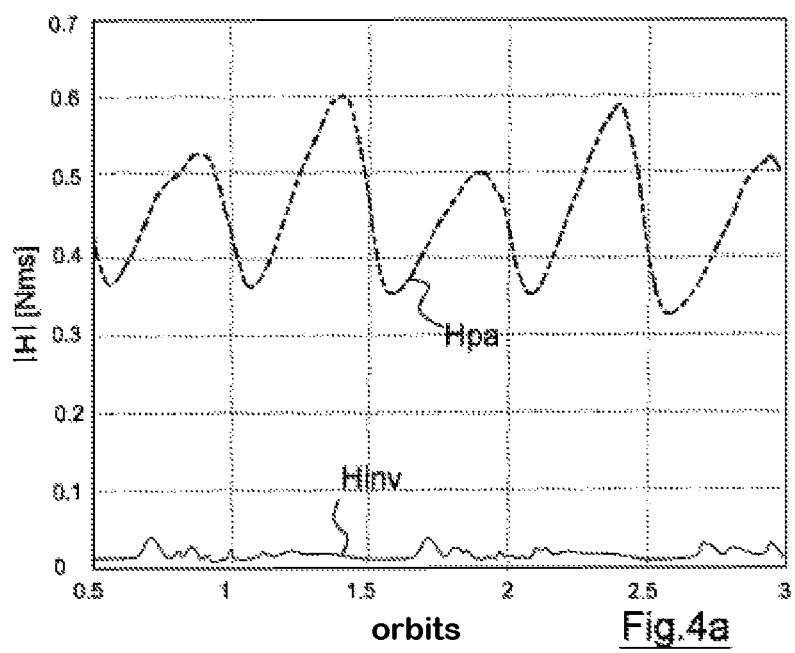
FIG. 4a represents the evolution, over time (expressed as number of orbits), of the total angular momentum Hinv and of the total angular momentum Hpa. It is observed that the total angular momentum Hinv obtained with the invention is much less than the total angular momentum Hpa obtained according to the prior art.
Figure 4B:
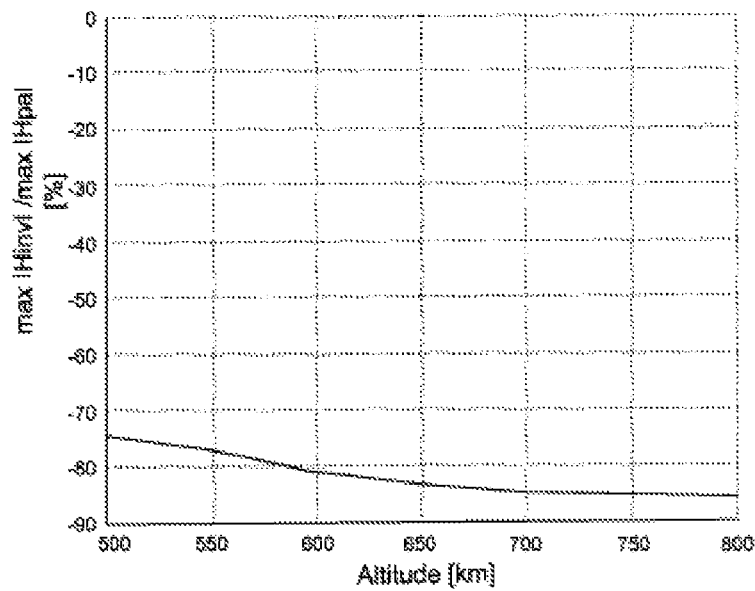
FIG. 4b represents the evolution, as a function of the altitude of the orbit of the satellite 10, of the ratio between:
- the maximum value (worst case) of the total angular momentum Hinv obtained with the invention,
- the maximum value (worst case) of the total angular momentum Hpa obtained according to the prior art.
Figure 4C:
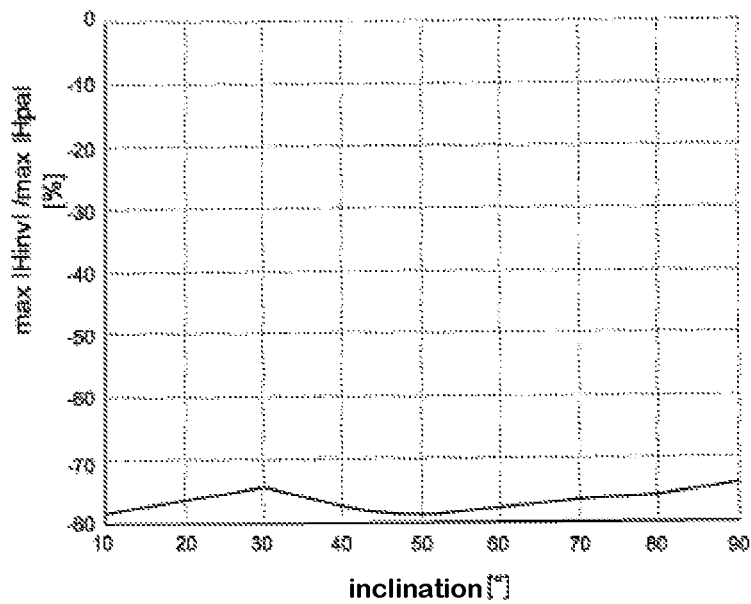

FIG. 4c represents the evolution, as a function of the inclination of the orbit of the satellite 10, of the ratio between:
- the maximum value (worst case) of the total angular momentum Hinv obtained with the invention,
- the maximum value (worst case) of the total angular momentum Hpa obtained according to the prior art.

It is observed that the invention makes it possible to obtain, in a span of inclinations lying between 10 degrees and 90 degrees, a reduction of greater than 70% in the total angular momentum of the storage device 20.

More generally, it should be noted that the modes of implementation and embodiment considered hereinabove have been described by way of nonlimiting examples, and that other variants may consequently be envisaged.

In particular, the invention has been described by considering magneto-torquers 24 implemented so as to desaturate an angular momentum storage device 20 of an attitude control system of a satellite 10. The invention is applicable more generally to the case of an implementation of said magneto-torquers to control the attitude of said satellite 10, that is to say to desaturate an angular momentum storage device 20 and/or to directly control the attitude of said satellite 10 (by forming a magnetic torque suitable for maintaining the attitude of the satellite 10 around an attitude setpoint). More generally, the magnetic torque to be formed is therefore determined as a function of a desired attitude control torque in relation to three axes, and designated by Tcmd, aimed at desaturating the storage device 20 and/or at directly controlling the attitude of the satellite 10. In particular, the magnetic torque to be formed is determined as a function of the uncontrollable component of said desired attitude control torque. The expressions hereinabove remain valid on replacing the desired variation ΔH of angular momentum by the following expression:

$$\Delta H = \frac{Tcmd}{Kn}$$

in which expression:
Tcmd corresponds to the desired attitude control torque,
Kn is a non-zero scalar parameter dimensionally equivalent to a frequency.

Furthermore, the invention has been described by considering a storage device 20 comprising reaction wheels. Nothing excludes, in relation to other examples, consideration of a storage device 20 comprising other types of inertial actuators suitable for storing angular momentum and for being desaturated by means of magneto-torquers. In particular, the storage device 20 can comprise gyroscopes.

Furthermore, the invention has been described by considering scalar parameters Kzx, Ky and Kz for the control matrix K. Nothing excludes, in relation to other examples, consideration of more complex control matrices, in which these scalar parameters were for example replaced with transfer functions aimed in particular at filtering the measurement noise and/or aimed at taking account of a more precise model of the variation of the direction of the terrestrial magnetic field.

The invention claimed is:

1. A method of commanding magneto-torquers of an attitude control system of a space vehicle subjected to an external magnetic field of variable direction, comprising the steps of:
controlling an attitude of the space vehicle by said magneto-torquers;
forming, in cooperation with a local external magnetic field, magnetic torques in a local control plane orthogonal to a direction of the local external magnetic field;
measuring the local external magnetic field;
determining a magnetic torque to be formed in the local control plane as a function of a desired three-axes attitude control torque;
commanding the magneto-torquers to form, in cooperation with the local external magnetic field, the determined magnetic torque; and
wherein the magnetic torque to be formed in the local control plane is determined as a function of a locally uncontrollable component of the desired attitude control torque which is orthogonal to the local control plane, the contribution of the locally uncontrollable component to the magnetic torque to be formed being non-zero when the locally uncontrollable component is non-zero.

2. The method as claimed in claim 1, further comprising the step of determining the contribution of the locally uncontrollable component to the magnetic torque to be formed in the local control plane as a function of a model of temporal variation of the direction of the external magnetic field.

3. The method as claimed in claim 1, further comprising the step of determining the magnetic torque to be formed, the space vehicle progressing in an orbital plane, by expressing a desired variation of angular momentum in a magnetic reference frame centered on the space vehicle and defined by three axes X, Y, Z: an axis X parallel to the direction of the local external magnetic field, an axis Y orthogonal to the axis X and situated in a plane orthogonal to the orbital plane, and an axis Z orthogonal to the axes X and Y.

4. The method as claimed in claim 3, further comprising the step of determining the magnetic torque to be formed, the space vehicle progressing in a low orbit, in the magnetic reference frame according to a control law expressed in the form:

$$Tmag = -\begin{bmatrix} 0 & 0 & 0 \\ 0 & Ky & 0 \\ Kzx & 0 & Kz \end{bmatrix} \cdot \frac{Tcmd}{Kn}$$

in which expression:
Tmag corresponds to the magnetic torque to be formed,
Tcmd corresponds to the desired attitude control torque,
Kn is a non-zero scalar parameter dimensionally equivalent to a frequency, and
Kzx, Ky and Kz are non-zero scalar parameters or non-zero transfer functions dimensionally equivalent to frequencies.

5. The method as claimed in claim 4, further comprising the step of expressing, the space vehicle in a polar orbit around the Earth, the scalar parameter Kzx in the form:

$$Kzx = 2 \cdot \omega_0 \cdot \left( \left( \frac{\omega_{CL}}{2 \cdot \omega_0} \right)^2 - 1 \right)$$

in which expression:
$\omega_0$ corresponds to the orbital frequency of the space vehicle,
$\omega_{CL}$ corresponds to the desired desaturation bandwidth.

6. The method as claimed in claim 1, wherein the attitude control system comprises an angular momentum storage device; and further comprising the step of desaturating the angular momentum storage system by transfer of angular momentum by the magneto-torquers.

7. The method as claimed in claim 6, further comprising the step of expressing the desired attitude control torque in the form:

$$Tcmd = Kn \cdot \Delta H$$

in which expression:
Tcmd corresponds to the desired attitude control torque,
Kn is a non-zero scalar parameter dimensionally equivalent to a frequency,
$\Delta H$ corresponds to a desired variation of the angular momentum of the storage device.

8. An attitude control system of a space vehicle subjected to an external magnetic field of variable direction, comprising:
a measurement device to measure a local external magnetic field;
magneto-torquers to form, in cooperation with the local external magnetic field, magnetic torques in a local control plane orthogonal to the direction of said local external magnetic field;
a command unit to determine a magnetic torque to be formed in the local control plane as a function of a desired three-axes attitude control torque, and to command the magneto-torquers to form the determined magnetic torque, wherein the command unit determines the magnetic torque to be formed in the local control plane as a function of a locally uncontrollable component of the desired attitude control torque which is orthogonal to the local control plane, the contribution of the locally uncontrollable component to the magnetic torque to be formed being non-zero when the locally uncontrollable component is non-zero.

9. The attitude control system as claimed in claim 8, wherein the measurement device is configured to measure the local external magnetic field in relation to three axes.

10. The attitude control system as claimed in claim 8, wherein the magneto-torquers are configured to form magnetic moments in relation to three axes.

* * * * *